US009427852B2

(12) United States Patent
Mizuno et al.

(10) Patent No.: US 9,427,852 B2
(45) Date of Patent: Aug. 30, 2016

(54) ROTARY IMPACT TOOL

(75) Inventors: Mitsumasa Mizuno, Osaka (JP); Toshiharu Ohashi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 713 days.

(21) Appl. No.: 13/814,250

(22) PCT Filed: Aug. 8, 2011

(86) PCT No.: PCT/JP2011/068029

§ 371 (c)(1), (2), (4) Date: Feb. 5, 2013

(87) PCT Pub. No.: WO2012/023452

PCT Pub. Date: Feb. 23, 2012

(65) Prior Publication Data

US 2013/0133912 A1 May 30, 2013

(30) Foreign Application Priority Data

Aug. 17, 2010 (JP) ................................ 2010-182486

(51) Int. Cl.
*B23Q 5/00* (2006.01)
*B25B 23/14* (2006.01)

(52) U.S. Cl.
CPC .................................. *B25B 23/1405* (2013.01)

(58) Field of Classification Search
CPC .......... B25C 1/08; B25D 17/12; B25D 17/22; B25D 9/125; B25B 23/1405
USPC ........................................ 173/1–11, 176–183
See application file for complete search history.

(56) References Cited

U.S. PATENT DOCUMENTS 4,185,701 A * 1/1980 Boys .................. B25B 23/1456 173/183
4,721,169 A * 1/1988 Nagasawa ............... B25B 23/14 173/178
5,377,769 A * 1/1995 Hasuo ....................... B25F 5/00 173/169
6,311,786 B1 * 11/2001 Giardino ............. B25B 23/1405 173/1
6,945,337 B2 9/2005 Kawai et al.
7,419,013 B2 9/2008 Sainomoto et al.
8,074,731 B2 * 12/2011 Iwata ...................... B25B 21/02 173/109

(Continued)

FOREIGN PATENT DOCUMENTS

JP 59-159585 5/1986
JP 7-116969 5/1995

(Continued)

OTHER PUBLICATIONS

International Search Report dated Oct. 21, 2011, and English translation thereof.

*Primary Examiner* — Robert Long
(74) *Attorney, Agent, or Firm* — Greenblum & Bernstein, P.L.C.

(57) ABSTRACT

A rotary impact tool comprises: a motor that is a rotation driving source; an impact generation device for generating a pulse impact by rotation of the motor and applying a rotational torque to an output shaft by the impact; a torque sensor for measuring the torque applied to the output shaft; and a control means for halting the motor when the torque measured by the torque sensor has reached a target torque having been set. The control means is configured to change an increased torque value for one impact according to the target torque having been set.

16 Claims, 3 Drawing Sheets

(56) References Cited

U.S. PATENT DOCUMENTS

| | | | | |
|---|---|---|---|---|
| 8,302,701 | B2 * | 11/2012 | Morimura | B25B 21/02 173/1 |
| 8,678,106 | B2 * | 3/2014 | Matsunaga | B25B 21/008 173/176 |
| 2001/0010267 | A1 * | 8/2001 | Kawarai | B25B 23/1453 173/180 |
| 2002/0020538 | A1 * | 2/2002 | Giardino | B25B 23/1405 173/176 |
| 2002/0129948 | A1 * | 9/2002 | Wursch | B23B 49/006 173/4 |
| 2004/0007370 | A1 * | 1/2004 | Giardino | B25B 21/02 173/1 |
| 2004/0045727 | A1 * | 3/2004 | Allums | B28D 7/005 173/1 |
| 2004/0182587 | A1 * | 9/2004 | May | B25B 23/14 173/2 |
| 2005/0023014 | A1 * | 2/2005 | Bermingham | E02D 13/06 173/2 |
| 2005/0109519 | A1 | 5/2005 | Kawai et al. | |
| 2005/0230130 | A1 * | 10/2005 | Strasser | B25F 5/00 173/2 |
| 2005/0263304 | A1 | 12/2005 | Sainomoto et al. | |
| 2005/0263305 | A1 * | 12/2005 | Shimizu | B25B 23/1405 173/2 |
| 2006/0185869 | A1 * | 8/2006 | Arimura | B25B 23/1475 173/176 |
| 2007/0074881 | A1 * | 4/2007 | Bermingham | E02D 7/02 173/2 |
| 2007/0103104 | A1 * | 5/2007 | May | B25B 23/1405 318/432 |
| 2008/0011251 | A1 * | 1/2008 | Tanaka | B25C 1/08 123/46 SC |
| 2008/0314162 | A1 | 12/2008 | Inoue | |
| 2009/0055028 | A1 * | 2/2009 | Kibblewhite | B25B 21/00 700/275 |
| 2009/0173194 | A1 * | 7/2009 | Chen | B25B 23/1405 81/469 |
| 2012/0168189 | A1 * | 7/2012 | Eckert | B25B 21/00 173/1 |
| 2013/0062088 | A1 * | 3/2013 | Mashiko | B25B 21/026 173/2 |
| 2013/0284475 | A1 * | 10/2013 | Hirabayashi | B25F 5/008 173/47 |
| 2013/0333910 | A1 * | 12/2013 | Tanimoto | B25B 21/02 173/176 |

FOREIGN PATENT DOCUMENTS

| | | |
|---|---|---|
| JP | 08-267368 | 10/1996 |
| JP | 2005-118910 | 5/2005 |
| JP | 3110344 | 6/2005 |
| JP | 2005-324265 | 11/2005 |
| WO | 2007-099626 | 7/2007 |

* cited by examiner

ROTARY IMPACT TOOL

TECHNICAL FIELD

The present invention relates to rotary impact tools, such as impact wrenches and impact drivers, used for works of tightening and loosening blots, nuts, and the like, and more particularly to a rotary impact tool having a torque sensor.

BACKGROUND ART

Rotary impact tools in which output portions are rotated by blow and impact from hammers that are driven so as to rotate by motors, or rotated by pulse impact produced by oil pressure, are widely used in construction sites and assembly plants since higher torque can be obtained by the impact being applied, as compared to rotary tools that simply use decelerators.

However, since the rotary impact tool has a high torque characteristic that a high torque can be obtained by one impact, a subject to be tightened tends to be excessively tightened, and the subject may be thus damaged. If an operator relatively loosely tightens a subject to be tightened lest the subject should be excessively tightened, a problem may arise that, for example, tightening torque becomes insufficient, and the subject cannot be fixed as intended.

In order to appropriately tighten a subject, for example, Japanese Laid-Open Patent Publication No. 8-267368 discloses that a torque sensor is mounted to an output shaft, and when a torque measured by the torque sensor reaches a target torque, a motor is halted.

On the other hand, in the rotary impact tool, an increase of torque for one impact is set so as to be great in order to quickly tighten a large bolt. However, if a small bolt is tightened by using the same tool, a torque may become higher than or equal to a target torque having been set, by only one impact being applied, or may become higher than torques within a range of the target torque even when the number of times an impact is applied is quite small. Therefore, a problem may arise that an accuracy of the tightening torque is reduced since it is difficult to halt the motor after an appropriate torque has been generated. Thus, a plurality of tools need to be selectively used depending on a magnitude of the target torque.

DISCLOSURE OF THE INVENTION

An object of the present invention is to provide a rotary impact tool capable of accurately performing the tightening with a wide range of target torques by use of a single rotary impact tool.

The present invention is directed to a rotary impact tool that includes: a motor that is a rotation driving source; an impact generation device for generating a pulse impact by rotation of the motor and applying a rotational torque to an output shaft by the impact; a torque sensor for measuring the torque applied to the output shaft; and a control means for halting the motor when the torque measured by the torque sensor has reached a target torque having been set, and, in the rotary impact tool, the control means is configured to change an increased torque value for one impact according to the target torque having been set.

In the rotary impact tool according to the present invention, while a high torque can be generated and a large screw can be tightened, small screws can be handled simply by a target torque being reduced when a small screw is tightened. Thus, the tightening can be accurately performed with a wide range of target torques by use of a single rotary impact tool. Therefore, the tightening can be accurately performed with a wide range of target torques by use of a single rotary impact tool without selecting a tool to be used from among a plurality of tools depending on a magnitude of the target torque.

According to the present invention, the control means preferably performs setting such that the lower the target torque is, the less the increased torque value is. Thus, the rotary impact tool is capable of handling a smaller screw simply by the target torque being further reduced.

According to the present invention, it is preferable that the control means stores a reference torque, and reduces the increased torque value when the target torque is lower than the reference torque, and increases the increased torque value when the target torque is higher than the reference torque. Thus, various screws can be handled by the target torque being changed so as to be lower or higher than the reference torque.

According to the present invention, it is preferable that the target torque includes at least a first target torque and a second target torque lower than the first target torque, the control means stores, as the increased torque value, at least a first increased torque value corresponding to the first target torque, and a second increased torque value corresponding to the second target torque, and the second increased torque value is set so as to be less than the first increased torque value. Thus, various screws can be handled by the target torque being set as the first or the second target torque.

According to the present invention, the control means preferably limits an output from the motor according to the target torque having been set. Thus, an increased torque value for one impact can be changed at low cost without providing additional components and the like.

According to the present invention, the control means preferably limits a maximum rotation speed of the motor according to the target torque having been set. Thus, control can be simplified.

Further, the control means preferably limits a maximum acceleration of the motor according to the target torque having been set. Thus, accuracy can be enhanced when the target torque is low since an output is reduced in a range in which the torque is low.

The control means preferably changes the increased torque value for one impact according to only a magnitude of the target torque having been set. Thus, control can be simplified.

The control means preferably changes the increased torque value for one impact according to a value of a difference between the target torque having been set, and the torque measured by the torque sensor, in addition to a magnitude of the target torque having been set. Thus, an output is increased in the beginning of the tightening, and the output can be further limited as the target torque is approached. Therefore, the target torque can be reached quickly with the number of times an impact is applied being reduced, and further accuracy can be enhanced.

Further, the control means preferably limits the increased torque value for one impact to such a value as to apply the impact at least a predetermined number of times until the target torque having been set is reached. Thus, the tightening can be halted near the target torque with an enhanced certainty.

In particular, when an error range of the target torque is up to ±x % thereof, the number of times the impact is to be applied until a lower limit in a range of the target torque is reached is preferably greater than or equal to 50/x. Thus, at least two impacts can be generated within the range of the target torque, and even if one more impact is applied until the motor is halted, depending on a timing for halting the motor, the tightening torque may not be beyond the range of the target torque, thereby enabling the tightening to be performed accurately within the target torque.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
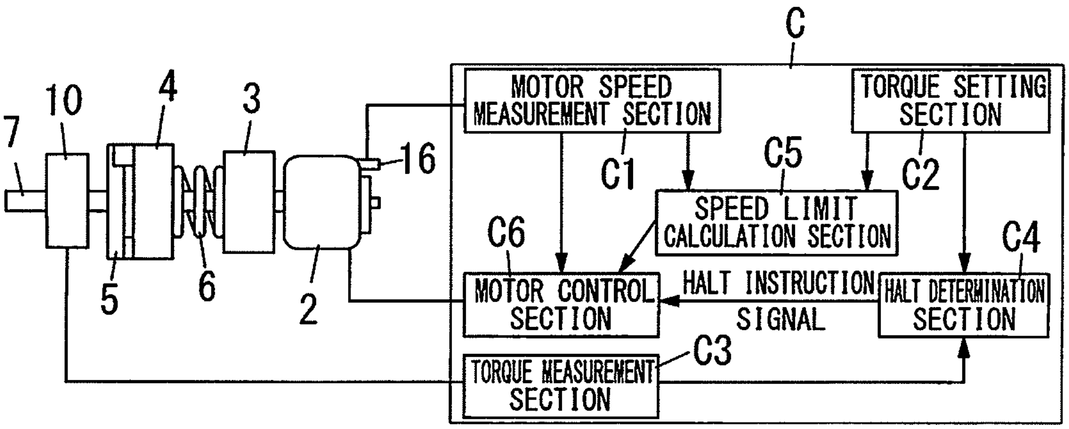
FIG. 1 is a block diagram illustrating an example of a rotary impact tool according to an embodiment of the present invention.

Hereinafter, an embodiment of the present invention will be described with reference to FIG. 1 to FIG. 5. A rotary impact tool 1 according to the present embodiment includes: a motor 2 that is a driving source; a decelerator 3 for decelerating rotation of the motor 2 at a predetermined reduction ratio; a hammer 4 to which the rotation of the motor 2 is conveyed through the decelerator 3; an anvil 5 to which a blow is delivered by the hammer 4; a spring 6 for urging the hammer 4 in the axial direction; an output shaft 7 to which a rotational force is impulsively applied by the blow; a torque sensor 10; and a control circuit C (a control means), as shown in FIG. 2. In FIG. 2, the output shaft 7 has a bit 8 mounted thereto. The blow of the hammer 4 is generated when the hammer 4 is retracted from the anvil 5 against the spring 6 and is then subjected to a predetermined or more rotation due to a predetermined or more load torque being applied between the hammer 4 and the anvil 5. Namely, the rotary impact tool 1 according to the present embodiment includes an impact generation device having the hammer 4 and the anvil 5.

The output shaft 7 has the torque sensor 10 mounted thereto. The torque sensor 10 includes: a magnetostrictive section (not shown) mounted to an outer surface of the output shaft 7; a detection coil (not shown) disposed on an outer circumference of the output shaft 7; and a yoke (not shown) that covers the detection coil so as to block an external magnetism and enhance a sensitivity of the detection coil. The magnetostrictive section is formed so as to include an amorphous foil that has a pattern of slits formed for torsional strain detection to exhibit a magnetostrictive characteristic and that is firmly adhered to the output shaft 7 by means of an epoxy adhesive. Strain is generated in the output shaft 7 by a torque being applied to the output shaft 7, and the magnetic characteristic of the magnetostrictive section 11 is varied according to the strain. A high-frequency voltage is applied to the detection coil by the control circuit C, and an output voltage varies according to the magnetic characteristic of the magnetostrictive section being varied. Therefore, a magnitude of the torque applied to the output shaft 7 can be obtained by the output voltage being measured.

The motor 2 connected to the control circuit C is controlled by the control circuit C so as to, for example, change a rotation speed according to an extent to which a trigger switch 15 is pulled, when an operator operates the trigger switch 15.

Further, the motor 2 is provided with a motor speed detection section 16 for detecting a rotation speed of the motor 2. As the motor speed detection section 16, a frequency generator for generating a frequency signal proportional to the number of rotations of the motor can be favorably used. In addition, the motor speed detection section 16 may be, for example, an encoder. Further, the motor speed may be detected according to a signal of a hall sensor or a counter electromotive force in the case of a brushless motor being used.

Figure 2:
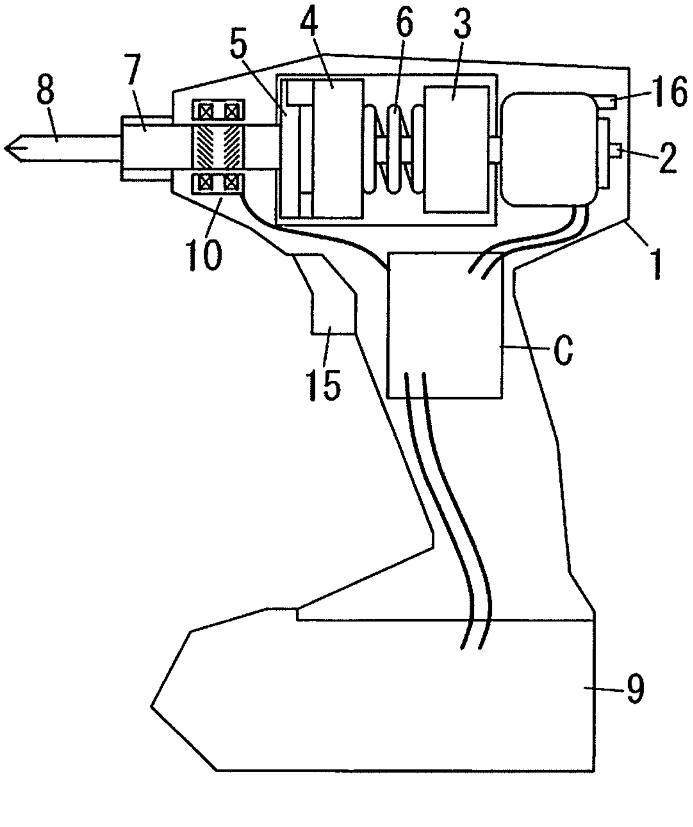
FIG. 2 is a schematic cross-sectional view of the rotary impact tool according to the embodiment of the present invention.
Figure 3:
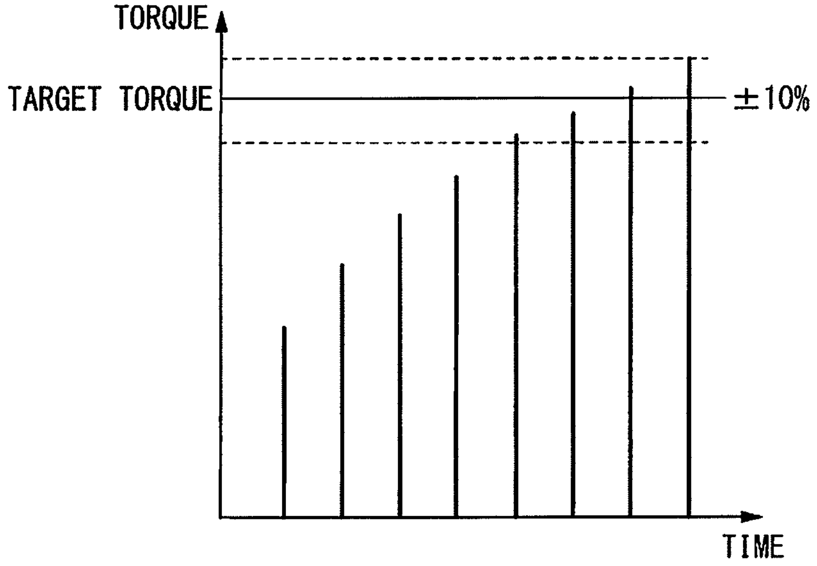
FIG. 3 illustrates an operation performed by the rotary impact tool according to the embodiment of the present invention when a target torque is high.

In a block diagram of FIG. 1, the control circuit C according to the present embodiment is shown. The control circuit C is configured to perform control for halting the tightening operation at a target torque and for changing the number of rotations of the motor 2 according to a magnitude of the target torque.

The control circuit C includes: a motor speed measurement section C1 for performing an A/D conversion of a signal from the speed detection section 16 to obtain the converted signal; a torque measurement section C3 for performing an A/D conversion of a signal from the torque sensor 10 to obtain the converted signal; and a motor control section C6 for performing feedback control of the number of rotations for the motor 2, as shown in FIG. 1.

Furthermore, the control circuit C according to the present embodiment includes: a torque setting section C2 for storing a target torque; a halt determination section C4 for determining whether or not a measured torque has reached the target torque stored in the torque setting section C3; and a speed limit calculation section C5 described below.

Specifically, when an operator sets a target torque for the tightening by means of a torque setting means (not shown) such as a dial, the target torque is set in the torque setting section C2. When the operator pulls the trigger switch 15, the motor control section C6 controls and drives the motor 2 so as to rotate at a speed equivalent to an extent to which the trigger switch 15 has been pulled. The halt determination section C4 determines whether or not a measured torque value (for example, a peak value) obtained by the torque sensor 10 and the torque measurement section C3 has reached the target torque (torques within a range from −10% of the target torque to +10% thereof) having been set in the torque setting section C2. When it is determined that the target torque has been reached, the halt determination section C4 transmits a halt instruction signal to the motor control section C6. When receiving the halt instruction signal, the motor control section C6 controls so as to halt the drive of the motor 2, and thereby the tightening operation is ended. In a case where the target torque set in the torque setting section C2 is relatively high, the motor 2 is driven to operate at a maximum speed by the trigger switch 15 being maximally pulled. In this case, an impact produced by the hammer 4 delivering a blow to the anvil 5 is great, and an increased torque value for one impact is also relatively great. The increased torque value for one impact is reduced with the progress of the tightening. When the torque has reached a range from −10% of the target torque to +10% thereof, the halt determination section C4 described above transmits the halt instruction signal to the motor control section C6 to halt the motor 2.

If, as in the conventional rotary impact tools, the motor 2 is driven to operate at a maximum speed when the trigger switch

Figure 5:
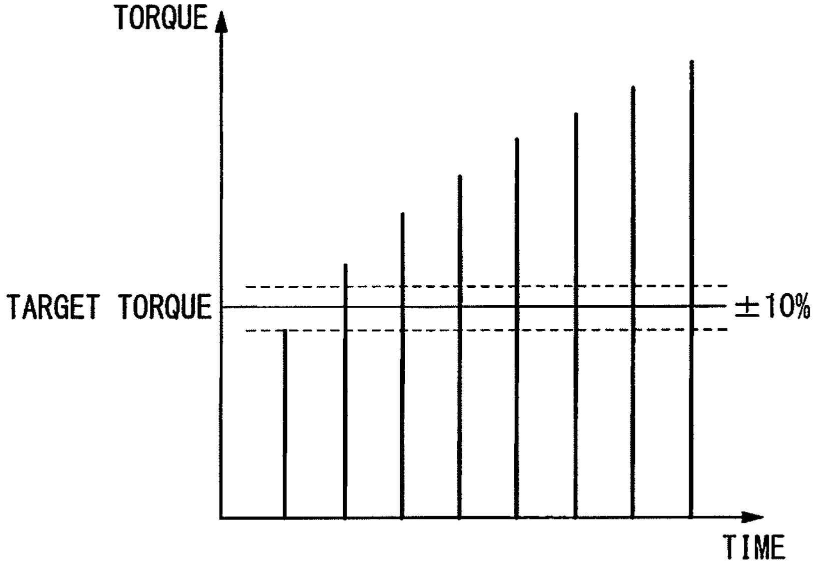
FIG. 5 illustrates a problem which arises in an operation performed in conventional arts.

15 is maximally pulled also in a case where the target torque set in the torque setting section C2 is relatively low, an increased torque value for one impact may be great to exceed the range from −10% of the target torque to +10% thereof with one impact as shown in FIG. 5, and therefore, the motor 2 cannot be halted at the target torque, so that the tightening may be excessively performed. Needless to say, if an operator adjusts an extent to which the trigger switch 15 is pulled so as to limit a rotation speed of the motor 2, the motor 2 can be controlled so as to halt when the target torque is reached. However, it is extremely difficult for the operator to adjust, according to the target torque, the extent to which the trigger switch 15 is pulled.

On the other hand, in the rotary impact tool according to the present invention, the control circuit C includes the speed limit calculation section C5. The control speed calculation section C5 is configured so as to limit a rotation speed of the motor 2 according to a magnitude of the target torque set in the torque setting section C2, when the trigger switch 15 is pulled by an operator. Specifically, the setting is made such that the lower the target torque set in the torque setting section C2 is, the less the increased torque value is. Namely, in a case where the target torque is relatively low, even when the trigger switch 15 is maximally pulled, the speed limit calculation section C5 limits a speed of the motor 2 so as not to reach a maximum speed, and the speed is further limited when an extent to which the trigger switch 15 is pulled is low.

For example, the torque setting section C2 may have a reference torque previously stored therein. The torque setting section C2 may be configured to reduce the increased torque value when the target torque having been set is lower than the reference torque, and to increase the increased torque value when the target torque is higher than the reference torque.

Besides the configurations described above, for example, at least a first target torque and a second target torque lower than the first target torque may be set as the target torques in the torque setting section C2. The torque setting section C2 stores, as the increased torque values, at least a first increased torque value corresponding to the first target torque, and a second increased torque value corresponding to the second target torque. The second increased torque value is set so as to be lower than the first increased torque value. Namely, in a case where a user selects and sets the second target torque, the second increased torque value is set. Consequently, the increased torque value for one impact is limited as compared to in a case where the first target torque is selected.

Figure 4:
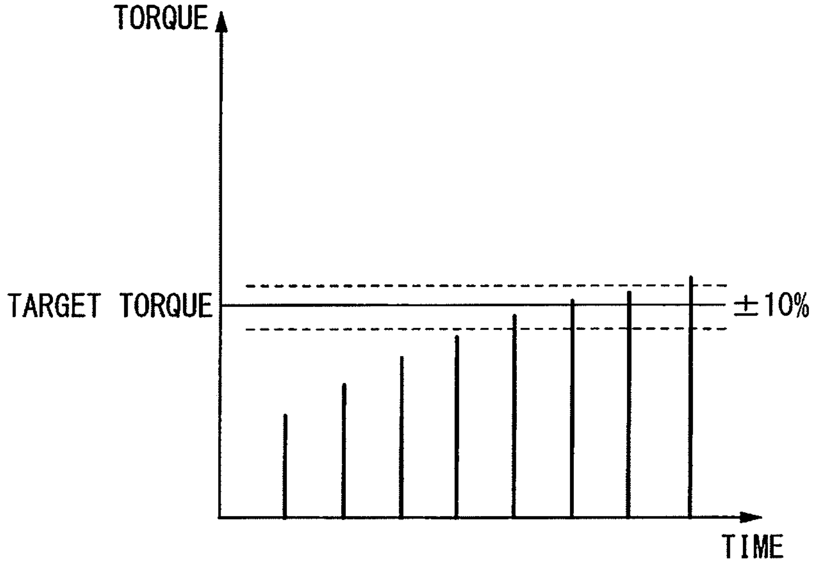
FIG. 4 illustrates an operation performed by the rotary impact tool according to the embodiment of the present invention when a target torque is low.

As described above, when the target torque set in the torque setting section C2 is relatively low, the increased torque value for one impact is set so as to be relatively small. Thus, as shown in FIG. 4, the number of times an impact is applied until the target torque is reached is increased, and the number of times an impact is applied so as to leave the torque within, for example, the range from −10% of the target torque to +10% thereof is increased. Therefore, when the motor 2 is halted by the halt determination section C4 transmitting the halt instruction signal to the motor control section C6, the tightening torque can be within the range of the target torque.

The rotation speed of the motor 2 obtained when the trigger switch 15 is maximally pulled is preferably limited according to a table that is obtained by calculation based on a magnitude of the target torque set in the torque setting section C2, and an intended error range. However, values other than the values in the table may be set depending on a subject to be tightened.

Further, when the error range of the target torque is up to ±x % thereof, the number of times an impact is applied until a lower limit in the range of the target torque is reached, is preferably greater than or equal to 50/x. When the error range is up to ±10% of the target torque as described above, the increased torque value for one impact is limited so as to reach the target torque over 5 or more pulses based on 50/10=5. In this case, since two or more impacts are generated within the range up to ±x % of the target torque, which includes the target torque and the error range thereof, even if the motor 2 does not halt with the first impact, the motor 2 can be halted with the second impact subsequent thereto. Therefore, the tightening torque can be within the range of the target torque with an enhanced certainty.

A rotation speed of the motor 2 may be changed also according to a value of a difference between a torque detected by the torque sensor 10 and the target torque. The number of rotations of the motor 2 may be reduced such that the closer the detected torque is to the target torque, the less the increased torque value for one impact is.

If a result of measurement of the torque is displayed or a result of determination as to whether or not the tightening operation has been appropriately performed is displayed after the tightening operation has been completed, an operator can work more at ease. If notification of a measured torque value and/or the result of the determination as to appropriateness are made to management means (not shown) such as an external terminal by communication, the tightening torque can be managed.

In the embodiment described above, the rotary impact tool that includes the impact generation device having the hammer 4 and the anvil 5 is described. However, an impact may be generated by an oil pressure pulse. Further, a case where the increased torque value for one impact is limited by the number of rotations of the motor being limited is described above. However, any configuration in which the increased torque value for one impact can be changed may be used. For example, in order to limit the increased torque value for one impact, acceleration may be limited, a speed reduction ratio may be changed, or an oil flow path may be changed for an oil pressure pulse.

Although the present invention has been described with reference to certain preferred embodiments, numerous modifications and variations can be made by those skilled in the art without departing from the true spirit and scope of this invention, namely claims.

The invention claimed is:

1. A rotary impact tool comprising:

a motor comprising a rotation driving source;

an impact generator that generates a pulse impact by rotation of the motor and applies a rotational torque to an output shaft by the pulse impact;

a torque sensor for measuring the rotational torque applied to the output shaft; and a controller for halting the motor when the rotational torque measured by the torque sensor has reached a predetermined target torque, wherein the controller is configured to change an increased torque value for one impact with time from a start of generating the pulse impact, the increased torque value being a difference between torques to be output by two successive impacts, wherein the predetermined target torque includes at least a first target torque and a second target torque that is different from the first target torque, wherein the controller is configured to store, as the increased torque value:

at least two increased torque values for the first target torque, which respectively correspond to second and third torques to be output by second and third impacts; and at least two second increased torque values for the second target torque, which respectively correspond to the second and third torques to be output by the second and third impacts, wherein a second increased torque value corresponding to the second torque to be output by the second impact, of the two second increased torque values, is different from a first increased torque value corresponding to the second torque to be output by the second impact, of the two first increased torque values, wherein the controller is configured to add, when the predetermined target torque is the first target torque, as the second torque, the first increased torque value corresponding to the second torque to be output by the second impact into a first torque to be output by a first impact, and, as the third torque, a first increased torque value corresponding to the third torque to be output by the third impact, of the two first increased torque values, into the second torque to be output by the second impact, wherein the controller is configured to add, when the predetermined target torque is the second target torque, as the second torque the second increased torque value corresponding to the second torque to be output by the second impact into the first torque to be output by the first impact, and, as the third torque, a second increased torque value corresponding to the third torque to be output by the third impact, of the two second increased torque values, into the second torque to be output by the second impact, and wherein the controller limits the increased torque value for one impact to a value so as to apply the impact at least a predetermined number of times until the predetermined target torque is reached.

2. The rotary impact tool according to claim 1, wherein, when an error range of the predetermined target torque is up to ±x % of the predetermined target torque, x being greater than 0, the number of times the impact is to be applied until a lower limit in a range of the predetermined target torque is reached is greater than or equal to a value obtained by dividing 50 by x.

3. The rotary impact tool according to claim 1, wherein the controller performs setting such that the lower the predetermined target torque is, the less the increased torque value is.

4. The rotary impact tool according to claim 1, wherein the controller stores a reference torque, and reduces the increased torque value when the predetermined target torque is lower than the reference torque, and increases the increased torque value when the predetermined target torque is higher than the reference torque.

5. The rotary impact tool according to claim 1, wherein the second target torque is lower than the first target torque, and the second increased torque value is less than the first increased torque value.

6. The rotary impact tool according to claim 1, wherein the controller limits an output from the motor according to the predetermined target torque.

7. The rotary impact tool according to claim 6, wherein the controller limits a maximum rotation speed of the motor according to the predetermined target torque.

8. The rotary impact tool according to claim 6, wherein the controller limits a maximum acceleration of the motor according to the predetermined target torque.

9. The rotary impact tool according to claim 1, wherein the controller changes the increased torque value for one impact according to only a magnitude of the predetermined target torque.

10. The rotary impact tool according to claim 2, wherein the controller performs setting such that the lower the predetermined target torque is, the less the increased torque value is.

11. The rotary impact tool according to claim 2, wherein the controller stores a reference torque, and reduces the increased torque value when the predetermined target torque is lower than the reference torque, and increases the increased torque value when the predetermined target torque is higher than the reference torque.

12. The rotary impact tool according to claim 2, wherein the second target torque is lower than the first target torque, and the second increased torque value is less than the first increased torque value.

13. The rotary impact tool according to claim 2, wherein the controller limits an output from the motor according to the predetermined target torque.

14. The rotary impact tool according to claim 1, wherein the controller changes the increased torque value for one impact according to a value of a difference between the predetermined target torque, and the torque measured by the torque sensor, and according to a magnitude of the predetermined target torque.

15. The rotary impact tool according to claim 2, wherein the controller changes the increased torque value for one impact according to a value of a difference between the predetermined target torque, and the torque measured by the torque sensor, and according to a magnitude of the predetermined target torque.

16. The rotary impact tool according to claim 1, the first target torque and the second target torque being appropriate for workpieces of different sizes.

* * * * *